(12) United States Patent
Atkinson

(10) Patent No.: US 7,320,220 B1
(45) Date of Patent: Jan. 22, 2008

(54) EGR VALVE HAVING INTEGRATED MOTOR, CONTROLLER, AND FLOW METER

(75) Inventor: David Conway Atkinson, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 11/639,160

(22) Filed: Dec. 15, 2006

(51) Int. Cl.
*F02B 33/44* (2006.01)
(52) U.S. Cl. ........................ 60/605.2; 60/611
(58) Field of Classification Search ............. 60/605.1, 60/605.2, 611; 123/559.1
See application file for complete search history.

(56) References Cited

U.S. PATENT DOCUMENTS

| | | | |
|---|---|---|---|
| 4,300,490 A | * | 11/1981 | Hattori et al. ............. 123/439 |
| 4,723,443 A | | 2/1988 | Usui et al. |
| 5,375,620 A | * | 12/1994 | Ginder, Jr. ............. 137/115.09 |
| 6,516,785 B1 | | 2/2003 | Nakada et al. |
| 6,609,374 B2 | | 8/2003 | Feucht et al. |
| 6,843,239 B2 | | 1/2005 | Fensom et al. |
| 6,886,544 B1 | | 5/2005 | Bui |
| 6,997,162 B2 | | 2/2006 | Hirayama et al. |
| 7,013,870 B2 | | 3/2006 | Kamimura et al. |
| 7,121,268 B2 | | 10/2006 | Andoh et al. |

* cited by examiner

*Primary Examiner*—Hoang Nguyen
(74) *Attorney, Agent, or Firm*—Finnegan, Henderson, Farabow, Garrett & Dunner, L.L.P.

(57) ABSTRACT

A valve arrangement for an internal combustion engine is disclosed. The valve arrangement may have a housing at least partially defining a venturi passageway, a first port disposed at an entrance to the venturi passageway, and a second port disposed at a throat of the venturi passageway. The valve arrangement may further have a valve element disposed within the housing to regulate the flow of fluid through the housing, and a sensor mounted to the housing in communication with the first and second ports. The valve arrangement may also have a controller mounted to the housing in communication with the sensor. The controller may be configured to affect movement of the valve element in response to input from the sensor.

21 Claims, 4 Drawing Sheets

EGR VALVE HAVING INTEGRATED MOTOR, CONTROLLER, AND FLOW METER

TECHNICAL FIELD

The present disclosure relates generally to an exhaust gas recirculation (EGR) valve and, more particularly, to an EGR valve having a motor, controller, and mass flow sensor integrated into a single subassembly.

BACKGROUND

Engines, including diesel engines, gasoline engines, natural gas engines, and other engines known in the art, exhaust a complex mixture of air pollutants. The air pollutants may be composed of gaseous and solid material, which include Nitrous Oxides (NOx) and particulate matter. Due to increased attention on the environment, exhaust emission standards have become more stringent and the amount of NOx and particulates emitted from an engine may be regulated depending on the type of engine, size of engine, and/or class of engine.

One method that has been implemented by engine manufacturers to comply with the regulation of NOx and particulate matter exhausted to the environment has been to recirculate exhaust gas from an engine back into the engine for subsequent combustion. The recirculated exhaust gas reduces the concentration of oxygen in the intake air supplied to the engine, which in turn lowers the maximum combustion temperature within cylinders of the engine. The reduced temperature decreases the formation of NOx. In addition, the exhaust gases contain some amount of particulate matter, which is burned upon recirculation through the engine cylinders, thereby lowering the amount of particulate matter exhausted to the environment.

When implementing exhaust gas recirculation (EGR), it may be necessary to tightly control the proportion of exhaust gas recirculated through the engine relative to fresh air drawn into the engine. For example, if the amount of exhaust gas recirculated through the engine is too great, the engine may not receive enough oxygen for proper operation and could possibly stall, produce insufficient levels of power, and/or produce excessive amounts of smoke and particulate matter because of poor combustion within the engine cylinders. Conversely, if the amount of exhaust gas recirculated into the engine is too little, the engine may not comply with NOx regulations.

Typically, the flow of exhaust gas back into the engine is regulated by way of a throttle arrangement in response to one or more input. The throttle arrangement generally includes a butterfly-type valve element disposed within an exhaust gas passageway and movable between open and closed positions to selectively pass or restrict the flow of exhaust gas to the intake of the engine. The valve element is movable between the open and closed positions based on a sensed mass flow rate of the exhaust. That is, a mass flow rate sensor is located within the exhaust gas passageway upstream or downstream of the throttle arrangement to generate a signal indicative of the flow rate of exhaust passing into the engine. A controller located elsewhere on the engine receives the exhaust flow rate signal, and generates a position command directed to a drive motor of the throttle arrangement.

Although the throttle arrangement described above may adequately provide the necessary control of exhaust flow back into the engine, it may be bulky, expensive, and difficult to tune. In particular, because each of the required components (i.e., motor, valve, controller, and flow rate sensor) are separate from each other, significant space on the engine or in the engine's compartment may be consumed by the different components. In addition, each separate component requires its own assembly process, which can significantly increase assembly time and cost. And, because each component is separately assembled to the engine, testing and tuning of the throttle arrangement can only be performed on-engine.

One attempt at an integral throttle arrangement for simplified assembly and testing is described in U.S. Pat. No. 6,997,162 (the '162 patent), issued to Hirayama et al. on Feb. 14, 2006. Specifically, the '162 patent describes a throttle arrangement for use in regulating the flow rate of air into an internal combustion engine. The throttle arrangement of the '162 patent includes an electronically controlled throttle body having a main air passage and a valve element disposed therein. The valve element is driven by a motor, which is externally mounted to the throttle body in a generally perpendicular direction relative to the main air passage. The throttle arrangement also includes a hot wire-type air flow meter, and a microcomputer integrated together with the main air passage, valve element, and motor to form a single body. The microcomputer receives signals from the flow meter indicative of the flow rate of fresh air entering the engine, calculates a pressure of the air based on the signals from the flow meter, and controls the drive motor to move the valve element based on the flow rate signals and calculated pressure.

Although the throttle arrangement of the '162 patent may integrate the necessary regulating components into a single assembled body, it may still be bulky, and its use limited. In particular, because the motor of the '162 patent is mounted to the throttle body in a generally perpendicular direction, the throttle arrangement may unnecessarily consume valuable space. And, because the throttle arrangement utilizes a hot wire-type air flow meter, its use may be confined to the regulation of only fresh air. That is, a hot wire-type air flow meter is very susceptible to contamination that can occur when exposed to exhaust gases. If coated with soot, the hot-wire type air flow meter can provide erroneous readings or possibly not function at all.

The disclosed EGR valve is directed to overcoming one or more of the problems set forth above.

SUMMARY OF THE INVENTION

In one aspect, the present disclosure is directed to a valve arrangement. The valve arrangement may have a housing at least partially defining a venturi passageway, a first port disposed at an entrance to the venturi passageway, and a second port disposed at a throat of the venturi passageway. The valve arrangement may further have a valve element disposed within the housing to regulate the flow of fluid through the housing, and a sensor mounted to the housing in communication with the first and second ports. The valve arrangement may also have a controller mounted to the housing in communication with the sensor. The controller may be configured to affect movement of the valve element in response to input from the sensor.

In another aspect, the present disclosure is directed to a power system. The power system may include an internal combustion engine configured to combust a fuel/air mixture to generate power and a flow of exhaust, an intake passageway configured to direct air into the internal combustion engine, an exhaust passageway configured to direct exhaust from the internal combustion engine, and a recirculation passageway configured to direct exhaust from the exhaust passageway to the intake passageway. The power system may also include a valve arrangement disposed within the recirculation passageway to regulate the flow of exhaust from the exhaust passageway to the intake passageway. The valve arrangement may include a housing at least partially defining a venturi passageway, a first port disposed at an entrance to the venturi passageway, a second port disposed at a throat of the venturi passageway, and a valve element disposed within the housing to regulate the flow of fluid through the housing. The valve arrangement may also include a differential pressure sensor mounted to the housing in communication with the first and second ports, a motor mounted to the housing and being configured to move the valve element, and a recirculation controller mounted to the housing in communication with the differential pressure sensor and the motor. The recirculation controller may be configured to command actuation of the motor in response to a differential pressure of the exhaust flowing through the housing.

DETAILED DESCRIPTION

Figure 1:
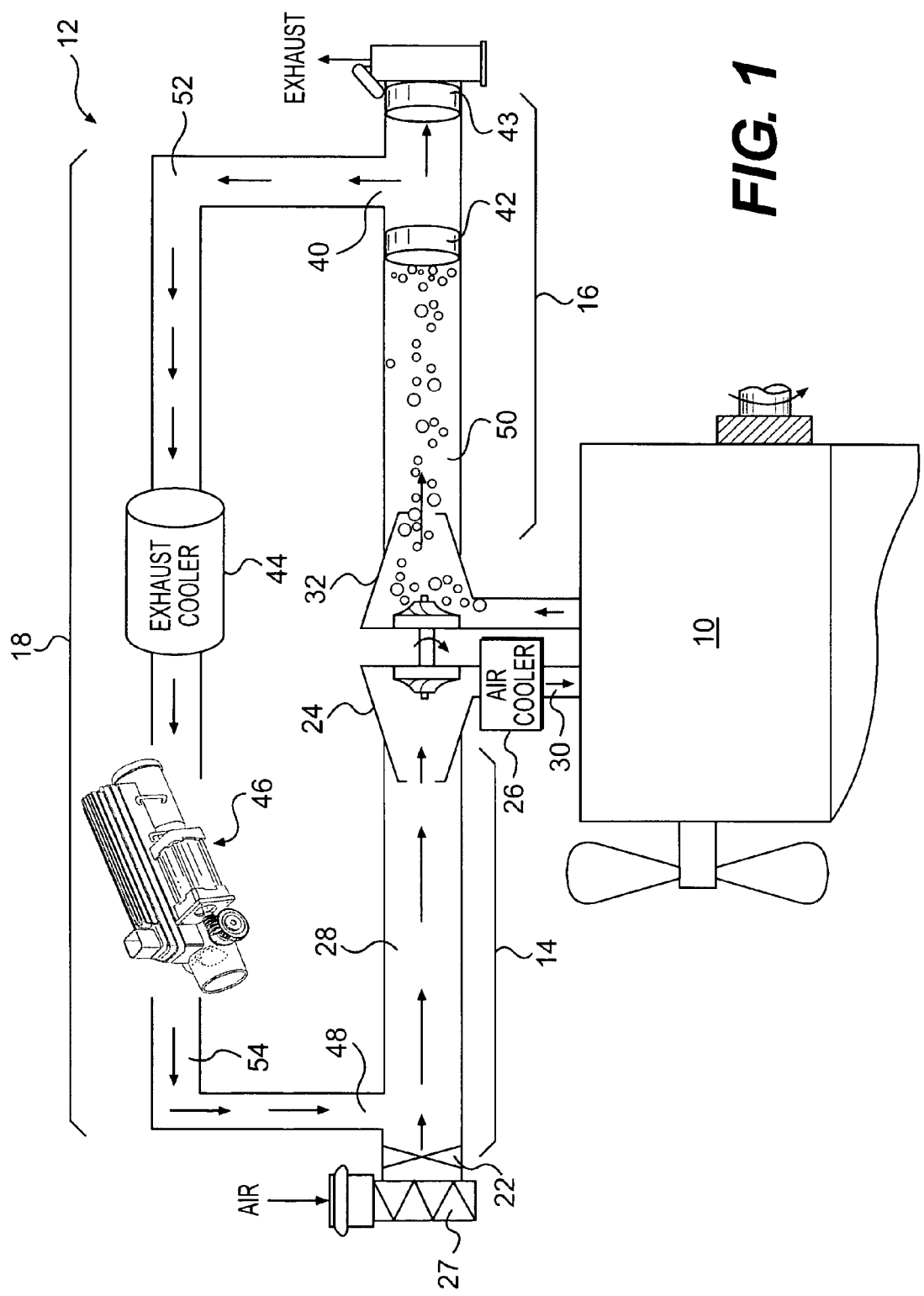
FIG. 1 is a diagrammatic illustration of a power source having an exemplary disclosed exhaust gas recirculation valve arrangement.

FIG. 1 illustrates a power source 10 having an exemplary exhaust treatment system 12. Power source 10 may include an engine such as, for example, a diesel engine, a gasoline engine, a gaseous fuel-powered engine such as a natural gas engine, or any other engine apparent to one skilled in the art. Power source 10 may, alternatively, include another source of power such as a furnace. Exhaust treatment system 12 may include an air induction system 14, an exhaust system 16, and a recirculation system 18 coupled to power source 10 to transfer fluids into and out of power source 10.

Air induction system 14 may include a means for introducing charged air into a combustion chamber (not shown) of power source 10. For example, air induction system 14 may include an induction valve 22, one or more compressors 24, and an air cooler 26. It is contemplated that additional and/or different components may be included within air induction system 14 such as, for example, one or more air cleaners 27, a waste gate or bypass circuit associated with compressors 24, a control system, and other means known in the art for introducing charged air into the combustion chambers of power source 10.

Induction valve 22 may regulate the flow of atmospheric air from cleaner 27 to compressors 24. Induction valve 22 may include, for example, a butterfly element, a shutter element, a gate element, a ball element, a globe element, or any other type of valve element known in the art. The element of induction valve 22 may be disposed within a passageway 28 and be movable from a flow passing position against a spring bias toward a flow restricting position. In one example, the element of induction valve 22 may be connected to a torsional spring (not shown) that may bias the element toward the flow restricting position. When in the flow passing position, atmospheric air may be directed through compressors 24 into power source 10 substantially unrestricted.

Compressors 24 may be disposed in a series relationship and fluidly connected to power source 10 to compress the air flowing into power source 10 to a predetermined level. Each of compressors 24 may embody a fixed geometry compressor, a variable geometry compressor, or any other type of compressor known in the art. It is contemplated that compressors 24 may alternatively be disposed in a parallel relationship or that air induction system 14 may include only a single compressor 24. It is further contemplated that compressors 24 may be omitted, when a non-pressurized air induction system is desired.

Air cooler 26 may be an air-to-air heat exchanger or an air-to-liquid heat exchanger and located to facilitate the transfer of heat to or from the air directed into power source 10. For example, air cooler 26 may embody a tube and shell type heat exchanger, a plate type heat exchanger, a tube and fin type heat exchanger, or any other type of heat exchanger known in the art. Air cooler 26 may be disposed within a passageway 30 that fluidly connects compressors 24 to power source 10.

Exhaust system 16 may include a means for directing exhaust flow out of power source 10. For example, exhaust system 16 may include one or more turbines 32 connected in a series relationship. It is contemplated that exhaust system 16 may include additional and/or different components such as, for example, emission controlling devices such as particulate filters 42, NOx absorbers 43, or other catalytic devices; attenuation devices; and other means known in the art for directing exhaust flow out of power source 10.

Each turbine 32 may be connected to one compressor 24 to drive the connected compressor 24. In particular, as the hot exhaust gases exiting power source 10 expand against blades (not shown) of turbine 32, turbine 32 may rotate and drive the connected compressor 24. It is contemplated that turbines 32 may alternatively be disposed in a parallel relationship or that only a single turbine 32 may be included within exhaust system 16. It is also contemplated that turbines 32 may be omitted and compressors 24 driven by power source 10 mechanically, hydraulically, electrically, or in any other manner known in the art, if desired.

Particulate filter 42 may be disposed downstream of turbines 32 to remove particulates from the exhaust flow directed from power source 10. It is contemplated that particulate filter 42 may include electrically conductive or non-conductive coarse mesh elements. It is also contemplated that particulate filter 42 may include a catalyst for reducing an ignition temperature of the particulate matter trapped by particulate filter 42, a means for regenerating the particulate matter trapped by particulate filter 42, or both a catalyst and a means for regenerating. The catalyst may support the reduction of HC, CO, and/or particulate matter, and may include, for example, a base metal oxide, a molten salt, and/or a precious metal. The means for regenerating may include, among other things, a fuel-powered burner, an electrically-resistive heater, an engine control strategy, or any other means for regenerating known in the art. It is further contemplated that particulate filter 42 may be omitted or located downstream of inlet port 40, if desired. It is further contemplated that an additional particulate filter (not shown) may be located within recirculation system 18, if desired.

NOx absorber 43 may include one or more substrates coated with or otherwise containing a liquid or gaseous catalyst such as, for example, a precious metal-containing washcoat. The catalyst may be utilized to reduce the byproducts of combustion in the exhaust flow by means of selective catalytic reduction (SCR) or NOx trapping. In one example, a reagent such as urea may be injected into the exhaust flow upstream of NOx absorber 43. The urea may decompose to ammonia, which reacts with NOx in the exhaust to form $H_2O$ and $N_2$. In another example, NOx in the exhaust may be trapped by a barium salt-containing device and be periodically released and reduced across a catalyst to form $CO_2$ and $N_2$. NOx absorber 43 may also be utilized to oxidize particulate matter that remains in the exhaust flow after passing through particulate filter 42, if desired.

Recirculation system 18 may include a means for redirecting a portion of the exhaust flow of power source 10 from exhaust system 16 into air induction system 14. For example, recirculation system 18 may include an inlet port 40, an exhaust cooler 44, a recirculation valve arrangement 46, and a discharge port 48. It is contemplated that recirculation system 18 may include additional and/or different components such as a catalyst, an electrostatic precipitation device, a shield gas system, and other means known in the art for redirecting exhaust from exhaust system 16 into induction system 14. As a portion of the exhaust from power source 10 enters recirculation system 18 via inlet port 40, the temperature thereof may be reduced to an acceptable level by cooler 44, restricted to a desired flow rate by recirculation valve arrangement 46, and directed into induction system 14 via outlet port 48.

Inlet port 40 may be connected to exhaust system 16 to receive at least a portion of the exhaust flow from power source 10. Specifically, inlet port 40 may be disposed downstream of turbines 32 to receive low-pressure exhaust gases from turbines 32. It is contemplated that inlet port 40 may alternatively be located upstream of turbines 32 to receive high-pressure exhaust gases, if desired.

Exhaust cooler 44 may be disposed within a fluid passageway 52 downstream of particulate filter 42 to cool the portion of exhaust flowing through inlet port 40. Exhaust cooler 44 may include a liquid-to-air heat exchanger, an air-to-air heat exchanger, or any other type of heat exchanger known in the art for cooling an exhaust flow. It is contemplated that exhaust cooler 44 may be omitted, if desired.

Recirculation valve arrangement 46 may be fluidly connected to exhaust cooler 44 via a fluid passageway 54 to regulate the flow of exhaust through recirculation system 18. Recirculation valve arrangement 46 may be operable to selectively pass or restrict the flow of exhaust therethrough. Although illustrated in FIG. 1 as being located downstream of exhaust cooler 44, it is contemplated that recirculation valve arrangement 46 may alternatively be located upstream of exhaust cooler 44, if desired.

Discharge port 48 may be fluidly connected to recirculation valve arrangement 46 to direct the exhaust flow regulated by recirculation valve arrangement 46 into air induction system 14. Specifically, discharge port 48 may be connected to air induction system 14 upstream of compressors 24, such that compressors 24 may draw the exhaust flow from discharge port 48.

Figure 2:
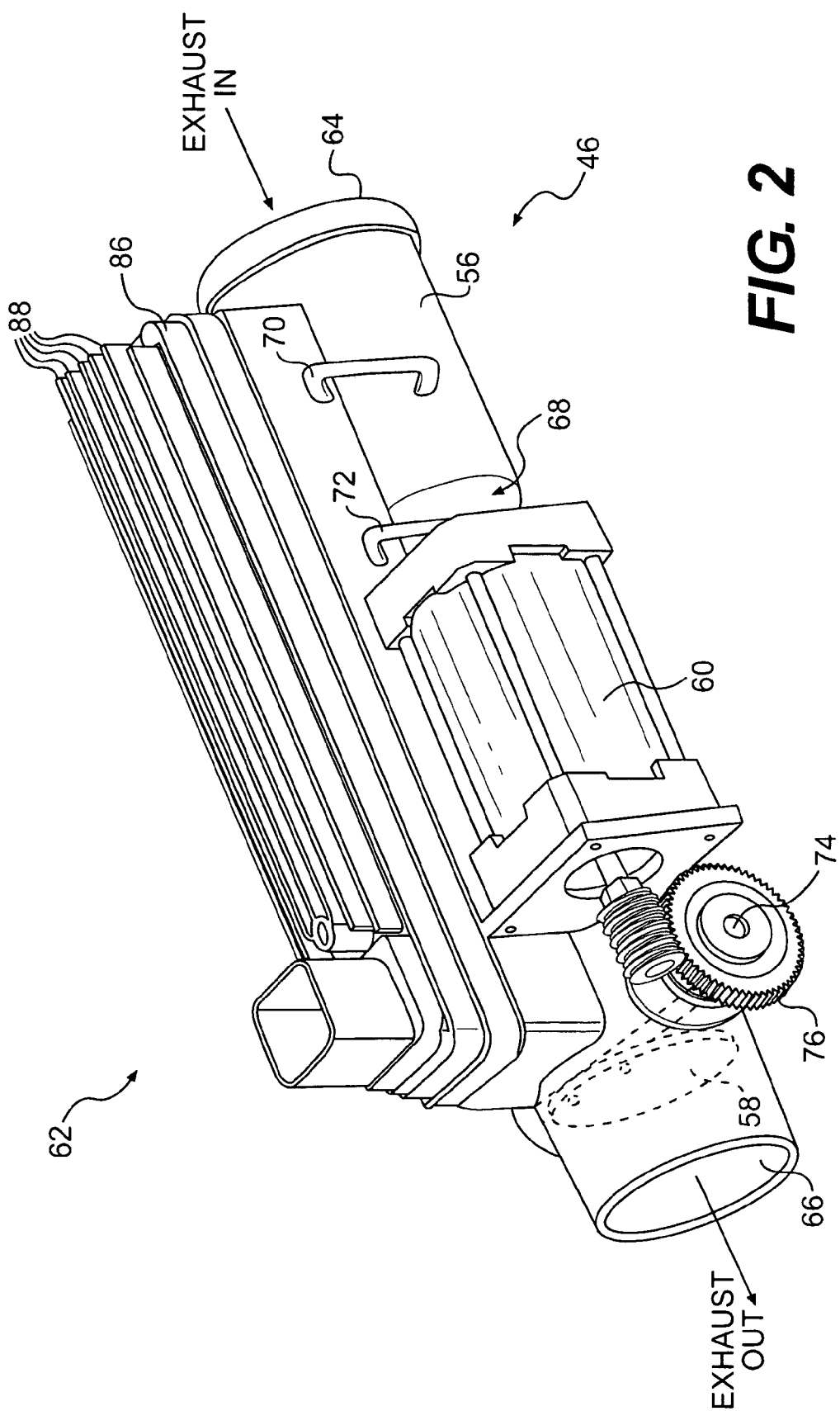
FIG. 2 is a pictorial view illustration of the exhaust gas recirculation valve arrangement of FIG. 1.

As illustrated in FIG. 2, recirculation valve arrangement 46 may be an assembly of multiple components that interact to regulate the flow of exhaust. For example, recirculation valve arrangement 46 may include a common housing 56, a valve element 58, a drive motor 60, and a control system 62. In response to one or more input, control system 62 may selectively actuate drive motor 60 to move valve element 58 between a flow passing and a flow blocking position, thereby variably restricting the flow of exhaust through common housing 56.

Common housing 56 may include an inlet 64, an outlet 66, a venturi 68, and a plurality of external fluid passageways. Exhaust may enter common housing 56 via inlet 64, flow through venturi 68, and exit common housing 56 via outlet 66. As the exhaust flows through a throat area 69 of venturi 68, the exhaust flow may be constricted, causing an increase in exhaust velocity and a decrease in exhaust pressure. While flowing through venturi 68, a portion of the exhaust from upstream of throat area 69 may be redirected to control system 62 via a first flow path 70, and a portion of the exhaust from throat area 69 may be redirected to control system 62 via a second flow path 72. The pressure difference between the exhaust flowing through first flow path 70 and the exhaust flowing through second flow path 72 caused by the constriction at throat area 69 may be utilized to determine a rate of the exhaust flowing through recirculation valve arrangement 46, as will be described in more detail below. It should be noted that, while first and second flow paths 70 and 72 are illustrated in FIG. 2 as being generally located on the same side of common housing 56 as drive motor 60, it is contemplated that flow paths 70 and 72 may alternatively be located on an opposing or adjacent side of common housing 56, if desired.

Valve element 58 may be disposed within common housing 56 downstream of venturi 68 to selectively restrict the flow of exhaust to power source 10. Because of it's location downstream of venturi 68, valve element 58 and, more specifically, the disrupted flow of exhaust across valve element 58 may have little, if any, affect on the components within first and second flow paths 70, 72. Valve element 58 may embody, for example, a butterfly element fixedly connected to a rotatable driveshaft 74. As driveshaft 74 is rotated, valve element 58 may move from a flow blocking position toward a flow restricting position. The term restrict, for the purposes of this disclosure, is to be interpreted as at least partially blocked from fluid flow. It is also contemplated that valve element 58, when in a flow restricting position, may be fully blocked from fluid flow.

Drive motor 60 may be situated to rotate driveshaft 74 and connected valve element 58. For example, drive motor 60 may embody a brushless DC rotary actuator mounted to common housing 56 and connected to driveshaft 74 to move valve element 58 between the flow passing and flow restricting position in a smooth continuous or step-wise manner. Drive motor 60 may be directly connected to driveshaft 74 or, alternatively, may be connected via a gear train 76, a ratcheting device, a pulley system, or in any other appropriate manner. It is contemplated that drive motor 60 may selectively rotate driveshaft 74 in response to one or more input commands from control system 62.

In one embodiment, drive motor 60 may be mounted to conserve space. Specifically, drive motor 60 may have an axial direction generally orthogonal to a rotation of drive motor 60. Drive motor 60 may be mounted to common housing 56 such that the axial direction of drive motor 60 is substantially parallel with a flow direction of exhaust through common housing 56. In this arrangement, gear train 76 may embody a worm/spur gear configuration to accommodate the parallel arrangement. By arranging drive motor 60 parallel with common housing 56, space consumed by drive motor 60 in a transverse direction may be minimized.

Figure 3:
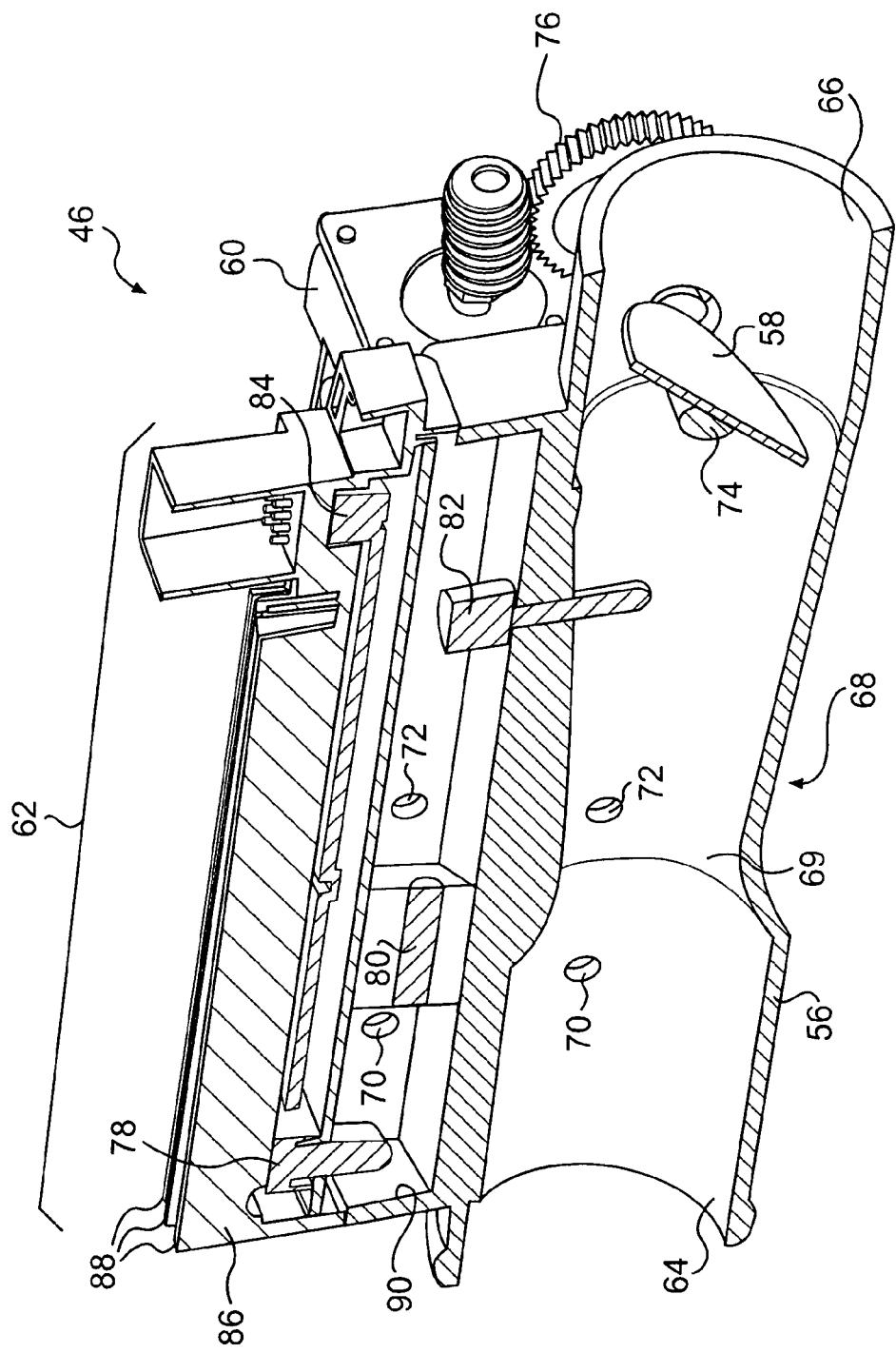
FIG. 3 is a cutaway view illustration of the exhaust gas recirculation valve arrangement of FIG. 1.

As illustrated in FIG. 3, control system 62 may include components that interact to determine operational characteristics of the exhaust flowing through recirculation valve arrangement 46 and to regulate the flow in response thereto. In particular, control system 62 may include an absolute pressure sensor 78, a differential pressure sensor 80, a temperature sensor 82, and a controller 84. Controller 84 may receive input from absolute pressure sensor 78, differential pressure sensor 80, and temperature sensor 82, and in response, command movement of drive motor 60. A cooling cover 86 having fins 88 may be associated with the components of control system 62 to facilitate air-cooling thereof. It is also contemplated that fluid may alternatively or additionally be circulated through cooling cover 86 for enhanced cooling, if desired.

Absolute pressure sensor 78 may be located in fluid communication with exhaust entering recirculation valve arrangement 46 to determine a pressure of the exhaust. For example, absolute pressure sensor 78 may be located in fluid communication with first flow path 70 via a recess 90 between an external surface of common housing 56 and an internal surface of cooling cover 86. Absolute pressure sensor 78 may embody a vacuum type pressure sensor and generate a signal indicative of the absolute pressure within recess 90 (i.e., the pressure magnitude above the reference vacuum pressure). This absolute pressure signal may then be communicated to controller 84.

Differential pressure sensor 80 may be located in fluid communication with exhaust entering recirculation valve arrangement 46 and with exhaust at throat area 69 to determine a pressure differential between the two areas. For example, differential pressure sensor 80 may be located in fluid communication with first flow path 70 and in fluid communication with second flow path 72 via recess 90. Differential pressure sensor 80 may compare the pressure of exhaust within first flow path 70 with the pressure of the exhaust within second flow path 72 and generate a signal indicative of the pressure difference. This differential pressure signal may then be communicated to controller 84.

Temperature sensor 82 may be located in fluid communication with exhaust exiting recirculation valve arrangement 46 to determine a temperature of the exhaust. For example, temperature sensor 82 may be a surface-temperature-type sensor that measures the temperature of common housing 56 at outlet 66 where the exhaust exits recirculation valve arrangement 46. Alternatively, temperature sensor 82 may be an air-temperature-type sensor that directly measures the temperature of the exiting exhaust. It is also contemplated that temperature sensor 82 may alternatively be located at inlet 64 of common housing 56, if desired. Temperature sensor 82 may generate a signal indicative of the exhaust temperature and communicate this temperature signal to controller 84.

Controller 84 may embody a single microprocessor or multiple microprocessors that include a means for controlling an operation of recirculation valve arrangement 46. Numerous commercially available microprocessors can be configured to perform the functions of controller 84. It should be appreciated that controller 84 could readily embody a general engine microprocessor capable of controlling numerous engine functions. Controller 84 may include a memory, a secondary storage device, a processor, and other components for running an application. Various other circuits may be associated with controller 84 such as power supply circuitry, signal conditioning circuitry, solenoid driver circuitry, and other types of circuitry.

One or more maps relating absolute pressure, differential pressure, temperature, actual flow rate, and/or desired flow rate may be stored in the memory of controller 84. Each of these maps may be in the form of tables, graphs, and/or equations. Controller 84 may be receive the signals generated by absolute pressure sensor 78, differential pressure sensor 80, and temperature sensor 82, and reference the map(s) stored in the memory thereof. From these maps, controller 84 may determine a position command, torque command, velocity command, or other similar command directed to drive motor that affects a desired movement of valve element 58 and subsequent flow rate of exhaust through recirculation valve arrangement 46.

In one example, an equation, EQ. 1 may be stored in the memory of control 84 and, as described below, utilized to calculate the mass flow rate of exhaust:

$$\dot{Q} = \rho \sqrt{\frac{1}{1 - \left(\frac{D_{throat}}{D_{inlet}}\right)^4}} (\pi D_{throat}^2) \sqrt{\frac{2(\Delta p)}{\rho}} \qquad \text{EQ. 1}$$

wherein:
$\dot{Q}$=mass flow rate of exhaust;
$\rho$=density of exhaust;
$D_{throat}$=diameter at throat;
$D_{inlet}$=diameter at inlet; and
$\Delta p$=pressure difference between inlet and throat.

As seen from EQ. 1, based on the pressure differential signal, known geometry of inlet 64 and throat area 69, and the density of exhaust passing through recirculation valve arrangement 46, the mass flow rate of the exhaust passing through recirculation valve arrangement 46 may be calculated. The density of exhaust used as an input to EQ. 1 may be calculated according to EQ. 2 below:

$$\rho = \frac{pR}{T} \qquad \text{EQ. 2}$$

wherein:
$\rho$=density of exhaust;
p=absolute pressure of exhaust at inlet;
R=gas constant of exhaust; and
T=temperature of exhaust.

Based on a comparison of the exhaust mass flow rate $\dot{Q}$ with a desired exhaust mass flow rate, controller 84 may either increase or decrease the restriction provided by valve element 58. For example, if $\dot{Q}$ is less than a desired mass flow rate, controller 84 may command drive motor 60 to move valve element 58 toward the flow passing position. In contrast, if $\dot{Q}$ is less than a desired mass flow rate, controller 84 may command drive motor 60 to move valve element 58 toward the flow restricting position.

Figure 4:
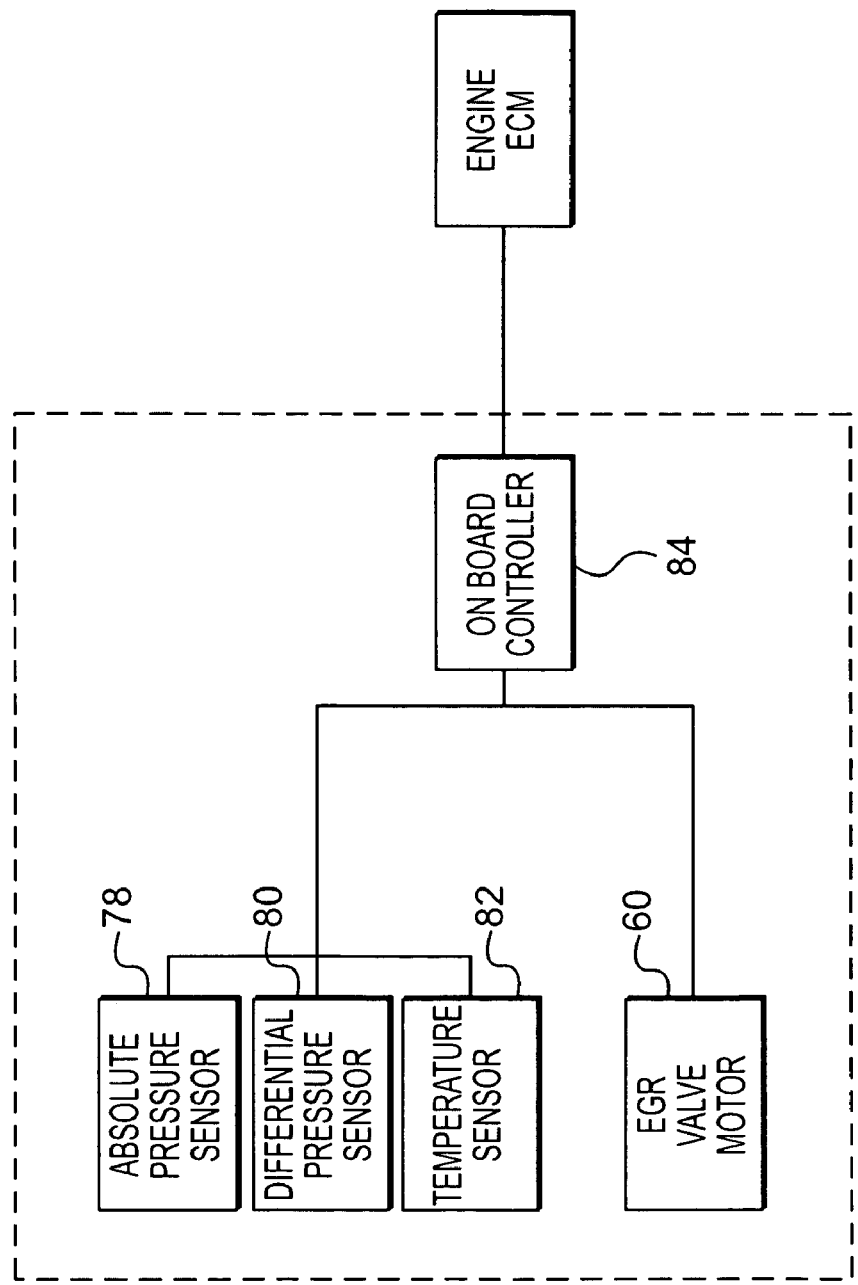
FIG. 4 is a control diagram for the exhaust gas recirculation valve of FIG. 1.

FIG. 4 illustrates a control diagram associated with operation of recirculation valve arrangement 46. From this diagram, it can be seen that most of the control associated with recirculation valve arrangement 46 can be accomplished internally. That is, because recirculation valve arrangement 46 integrates controller 84, absolute pressure sensor 78, differential pressure sensor 80, temperature sensor 82, drive motor 60, and valve element 58 into a single assembly, the only communication between recirculation valve arrangement 46 a controller of power source 10 may include the receipt of a desired flow rate. As such, extensive testing and calibration of recirculation valve arrangement 46 may be completed before arrangement 46 is even assembled to power source 10.

INDUSTRIAL APPLICABILITY

The disclosed valve arrangement may be applicable to any combustion-type device such as, for example, an engine, a furnace, or any other combustion device known in the art where precise and reliable fluid regulation is necessary. The disclosed valve arrangement may be particularly applicable to exhaust treatment systems that benefit from a simple, inexpensive, and compact solution to controlling the amount of exhaust gas directed into the combustion device. The operation of exhaust treatment system 12 will now be explained.

Atmospheric air may be drawn into air induction system 14 via induction valve 22 and directed through compressors 24 where it may be pressurized to a predetermined level before entering the combustion chamber of power source 10. Fuel may be mixed with the pressurized air before or after entering the combustion chamber of power source 10, and then be combusted by power source 10 to produce mechanical work and an exhaust flow containing gaseous compounds and solid particulate matter. The exhaust flow may be directed from power source 10 to turbines 32 where the expansion of hot exhaust gases may cause turbines 32 to rotate, thereby rotating connected compressors 24 to compress the inlet air. After exiting turbines 32 and flowing through particulate filter 42, the exhaust gas flow may be divided into two substantially particulate-free flows, including a first flow redirected to air induction system 14 and a second flow directed to the atmosphere.

The flow of the reduced-particulate exhaust directed through inlet port 40 may be cooled by exhaust cooler 44 to a predetermined temperature and then drawn via recirculation valve arrangement 46 back into air induction system 14 by compressors 24. To regulate the flow of exhaust back into air induction system 14, drive motor 60 may rotate driveshaft 74 to move valve element 59 between the flow passing and flow blocking positions. The controlled restriction of exhaust by valve element 58 may affect the amount of exhaust drawn by compressors 24 through air induction system 14 to power source 10.

The recirculated exhaust flow may then be mixed with the air entering the combustion chambers. The exhaust gas, which is directed to the combustion chambers of power source 10, may reduce the concentration of oxygen therein, which in turn lowers the maximum combustion temperature within power source 10. The lowered maximum combustion temperature may slow the chemical reaction of the combustion process, thereby decreasing the formation of nitrous oxides. In this manner, the gaseous pollution produced by power source 10 may be reduced without experiencing the harmful effects and poor performance caused by excessive particulate matter being directed into power source 10. As the second flow of exhaust passes inlet port 40, it may be directed through a catalyst to remove NOx and other pollutants from the exhaust.

Because of the unique assembly configuration of drive motor 60 to common housing 56, the space on power system 10 may be conserved. That is, because the axial direction of drive motor 60 may be substantially parallel with a flow direction of exhaust through common housing 56, very little space in the transverse direction may be consumed. This conserved space may improve design flexibility associated with other components and systems of power source 10.

Because recirculation valve arrangement 46 utilizes a venturi-style flow meter, recirculation valve arrangement 46 may have extended use, as compared to the prior art. Specifically, because the differential pressure sensors utilized by arrangement 46 to determine flow rate may be minimally affected by the presence of soot, arrangement 46 may be have extended life and control accuracy, even when utilized in an exhaust treatment application.

It will be apparent to those skilled in the art that various modifications and variations can be made to the disclosed valve arrangement. Other embodiments will be apparent to those skilled in the art from consideration of the specification and practice of the disclosed valve arrangement. It is intended that the specification and examples be considered as exemplary only, with a true scope being indicated by the following claims and their equivalents.

What is claimed is:

1. A valve arrangement, comprising:
   a housing at least partially defining a venturi passageway;
   a first port disposed at an entrance to the venturi passageway;
   a second port disposed at a throat of the venturi passageway;
   a valve element disposed within the housing to regulate the flow of fluid through the housing;
   a sensor mounted to the housing in communication with the first and second ports; and
   a controller mounted to the housing in communication with the sensor, the controller being configured to affect movement of the valve element in response to input from the sensor.

2. The valve arrangement of claim 1, further including a motor mounted to the housing, the motor being configured to move the valve element in response to a command from the controller.

3. The valve arrangement of claim 2, wherein the motor includes an axial direction generally parallel with a flow of fluid through the housing, when the motor is mounted to the housing.

4. The valve arrangement of claim 2, wherein the motor is a rotary actuator and connected to the valve element by way of a gear train.

5. The valve arrangement of claim 1, wherein the sensor is a differential pressure sensor configured to generate a signal indicative of a pressure difference between the fluid in the first and second ports.

6. The valve arrangement of claim 5, wherein the controller is configured to determine a mass flow rate of fluid through the housing based on the signal from the differential pressure sensor.

7. The valve arrangement of claim 6, further including a temperature sensor disposed within the housing to generate a signal indicative of a temperature of the fluid, wherein the mass flow rate is further determined based on the signal from the temperature sensor.

8. The valve arrangement of claim 6, further including an absolute pressure sensor disposed within the housing to generate a signal indicative of the absolute pressure of the fluid, wherein the controller is configured to determine a mass flow rate of fluid through the housing based on the signal from the absolute pressure sensor.

9. The valve arrangement of claim 1, wherein the valve element is disposed downstream of the first and second ports.

10. The valve arrangement of claim 8, further including a cover associated with the differential pressure sensor, controller, temperature sensor, and absolute pressure sensor, wherein the cover includes externally located cooling fins.

11. A power system, comprising:
an internal combustion engine configured to combust a fuel/air mixture to generate power and a flow of exhaust;
an intake passageway configured to direct air into the internal combustion engine;
an exhaust passageway configured to direct exhaust from the internal combustion engine;
a recirculation passageway configured to direct exhaust from the exhaust passageway to the intake passageway; and
a valve arrangement disposed within the recirculation passageway to regulate the flow of exhaust from the exhaust passageway to the intake passageway, the valve arrangement including:
  a housing at least partially defining a venturi passageway;
  a first port disposed at an entrance to the venturi passageway;
  a second port disposed at a throat of the venturi passageway;
  a valve element disposed within the housing to regulate the flow of fluid through the housing;
  a differential pressure sensor mounted to the housing in communication with the first and second ports;
a motor mounted to the housing and being configured to move the valve element; and
  a recirculation controller mounted to the housing in communication with the differential pressure sensor and the motor, the recirculation controller being configured to command actuation of the motor in response to a differential pressure of the exhaust flowing through the housing.

12. The power system of claim 11, further including an exhaust cooler located upstream of the valve arrangement.

13. The power system of claim 11, further including a particulate filter located upstream of the valve arrangement.

14. The power system of claim 11, further including an engine controller in communication with the recirculation controller.

15. The power system of claim 11, wherein the motor includes an axial direction generally parallel with a flow of exhaust through the housing when the motor is mounted to the housing.

16. The power system of claim 11, wherein the motor is a rotary actuator and connected to the valve element by way of a gear train.

17. The power system of claim 11, wherein the recirculation controller is configured to determine a mass flow rate of exhaust through the housing based on the differential pressure sensor.

18. The power system of claim 17, wherein the valve arrangement further includes a temperature sensor disposed within the housing to generate a signal indicative of a temperature of the exhaust, wherein the mass flow rate is determined based further on the exhaust temperature.

19. The power system of claim 18, wherein the valve arrangement further includes an absolute pressure sensor disposed within the housing to generate a signal indicative of the absolute pressure of the exhaust, wherein the mass flow rate is determined based further on the absolute pressure.

20. The power system of claim 11, wherein:
the valve arrangement further includes a cover associated with the differential pressure sensor, the recirculation controller, the temperature sensor, and the absolute pressure sensor; and
the cover includes externally located cooling fins.

21. The valve arrangement of claim 1, wherein the sensor is configured to measure a characteristic of the fluid at the first and second ports.

* * * * *